United States Patent [19]

Hutton et al.

[11] Patent Number: 4,654,495
[45] Date of Patent: Mar. 31, 1987

[54] SHEET METAL TACKING AND BONDING METHOD AND APPARATUS

[76] Inventors: Roger L. Hutton, 3141 Pinewood Ct., Milford, Mich. 48042; John P. Williams, Jr., 10475 Moon Lake Ct., Pinckney, Mich. 48169

[21] Appl. No.: 845,609

[22] Filed: Mar. 28, 1986

Related U.S. Application Data

[63] Continuation-in-part of Ser. No. 702,498, Feb. 18, 1985, and a continuation-in-part of Ser. No. 748,391, Jun. 24, 1985, Pat. No. 4,602,139, which is a continuation-in-part of Ser. No. 655,684, Sep. 28, 1984, abandoned.

[51] Int. Cl.$^4$ ................................................ H05B 6/10
[52] U.S. Cl. .............................. 219/10.41; 219/10.53; 219/10.57; 219/10.67; 156/274.2; 156/380.2
[58] Field of Search ............... 219/10.53, 10.57, 10.67, 219/10.69, 10.71, 10.73, 10.75, 10.79, 9.5, 10.41, 10.43, 85 A; 156/272.2, 273.3, 273.5, 273.7, 273.9, 274.2, 275.1, 275.3, 379.6, 379.7, 379.8, 379.9, 380.2, 380.4

[56] References Cited

U.S. PATENT DOCUMENTS

| | | | |
|---|---|---|---|
| 3,396,258 | 8/1968 | Leatherman | 219/10.53 |
| 3,460,310 | 8/1969 | Adcock et al. | 219/10.53 X |
| 3,467,806 | 9/1969 | Dixon | 219/10.73 |
| 3,580,780 | 5/1971 | Klawunn et al. | 219/10.53 X |
| 3,725,630 | 4/1973 | Gagliardi | 219/10.79 |
| 3,798,403 | 3/1974 | Mitchell et al. | 219/10.53 |
| 4,252,585 | 2/1981 | Raabe et al. | 219/10.53 X |
| 4,258,241 | 3/1981 | Soworowski | 219/10.71 |
| 4,501,943 | 2/1985 | Lund | 219/10.43 |

*Primary Examiner*—Philip H. Leung
*Attorney, Agent, or Firm*—Barnes, Kisselle, Raisch, Choate, Whittemore & Hulbert

[57] ABSTRACT

A method and apparatus for structurally bonding together overlapped portions of sheet metal with a two-stage plastic resin between them. The resin is heated in the first stage to tack together the sheet metal portions by applying alternating current for not more than 15 seconds to an induction coil disposed adjacent one of the sheet portions to heat it to a maximum temperature in the range of 200° F. to 400° F. Preferably, after being tacked together, the sheet metal assembly is painted. In the second stage, the resin is fully cured to structurally bond together the sheet metal portions preferably by heating the entire assembly to a maximum temperature in the range of about 200° F. to 400° F. for a period of 45 to 15 minutes. Alternately, in the second stage the resin can be heated to cure and structurally bond together the sheet metal portions by at least one induction coil to which an alternating current is applied for not more than 15 seconds.

21 Claims, 22 Drawing Figures

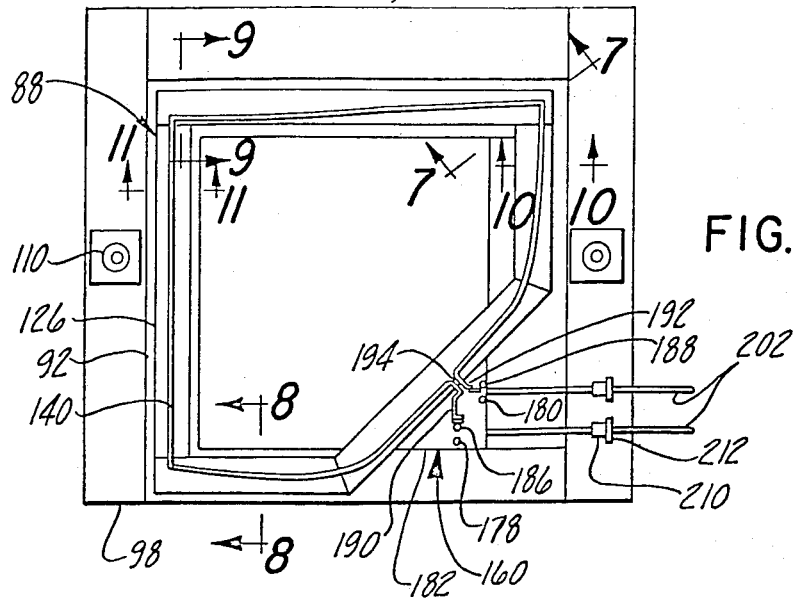
FIG. 5
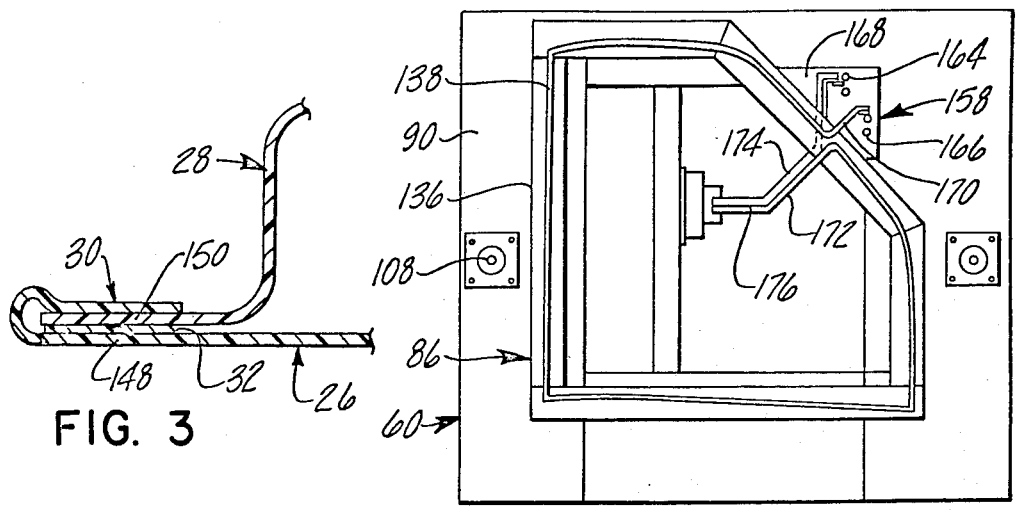
FIG. 3
FIG. 6
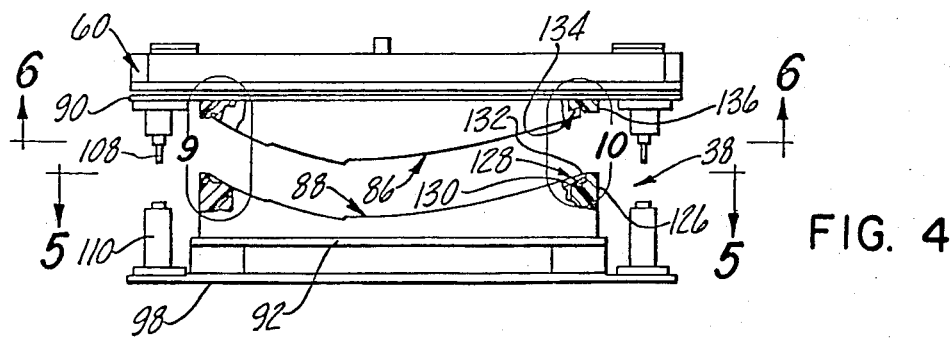
FIG. 4

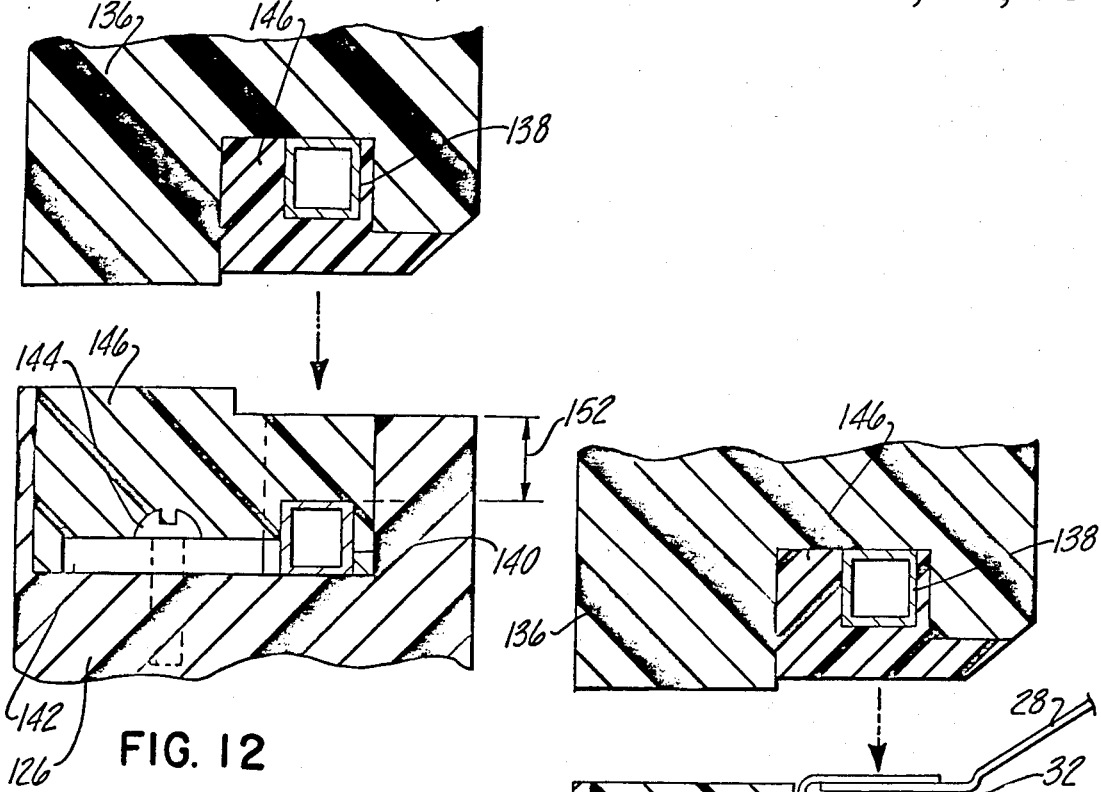
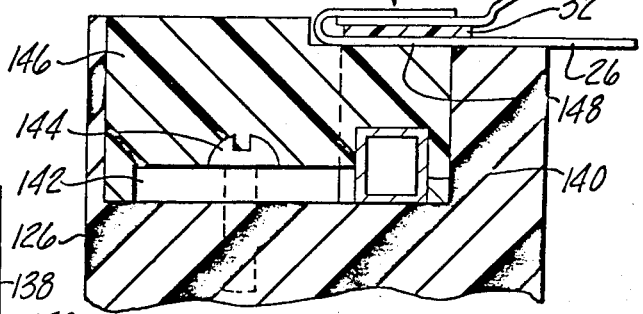
FIG. 13
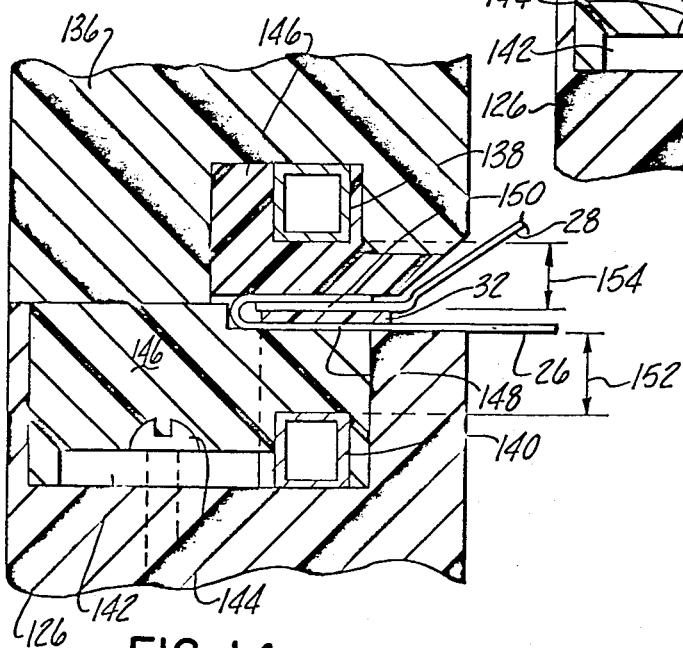
FIG. 12
FIG. 14

SHEET METAL TACKING AND BONDING METHOD AND APPARATUS

REFERENCE TO CO-PENDING APPLICATION

This application is a continuation-in-part of copending U.S. application Ser. No. 702,498 filed Feb. 18, 1985 and copending U.S. application Ser. No. 748,391 filed June 24, 1985 now U.S. Pat. No. 4,602,139 as a continuation-in-part of U.S. application Ser. No. 655,684, filed Sept. 28, 1984 and now abandoned.

FIELD OF THE INVENTION

This invention relates to the adhering together of sheet metal by a heat activated adhesive or plastic resin and more particularly to the bonding of a sheet metal assembly with a two stage resin.

BACKGROUND OF THE INVENTION

In manufacturing bodies for vehicles such as trucks, cars and buses, panels of sheet metal have been structurally secured together by placing a ribbon of a plastic epoxy resin between overlapped portions of the panels. Typically, the resin is a one stage resin which is cured to bond the panels together by heating it only once to an elevated temperature for a substantial period of time to fully cure the resin. The resin has been cured by heating the whole assembly by passing it through a paint baking oven or by somewhat localized heating of substantial portions of the assembly with infrared lamps or the direct flame of gas torches. All these approaches require several minutes to heat the assembly sufficiently to fully cure the one stage resin. Moreover, this localized heating or cooling of the assembly or even rapid heating or cooling of the entire assembly tends to significantly warp or distort the panels of the assembly. This distortion can only be partially controlled by firmly or rigidly clamping in fixtures the panels adjacent the ribbon of epoxy. These fixtures also accurately locate the sheet metal panels until they are structurally bonded together by the cured epoxy resin.

If the sheet metal assembly is bare or unpainted, this heating to cure the resin also results in sufficient oxidation of the metal so that subsequently applied paint will not adequately adhere to the metal. Consequently, when a painted assembly is required, either the bonded sheet metal assembly must be cleaned or otherwise processed to remove the oxidation and then be painted or be painted before being heated to cure the epoxy. However, if the sheet metal assembly is painted before the epoxy is cured, it must be handled carefully to prevent the panels of the assembly from shifting or moving so that they are inaccurately located relative to each other. In many applications, the need to accurately locate the sheet metal panels of the assembly and/or to rigidly clamp them during heating, means that with many assemblies and in many manufacturing processes and applications, it is impractical or impossible to bond the resin to structurally secure together panels after they have been painted.

SUMMARY OF THE INVENTION

In accordance with this invention, a two stage adhesive or plastic resin in a sheet metal assembly is rapidly momentarily heated to a temperature preferably of about 300° F. to 350° F. to tack the resin to the sheet by rapidly induction heating only portions of the assembly immediately adjacent the adhesive or resin. These portions of the assembly are rapidly heated by being disposed adjacent an induction coil or preferably between at least one pair of generally opposed induction coils through which an alternating current is passed for not more than about fifteen seconds. To avoid distortion of the assembly, areas of the sheet metal immediately adjacent the resin are not clamped or rigidly held and only these areas are significantly heated by utilizing a high frequency alternating current desirably of at least 3,000 Hz. Preferably, to more rapidly heat the sheet metal this current has a frequency of at least 50,000 Hz.

To provide a short cycle time and insure tacking of the resin, this current preferably has a high energy or power level of at least about 350 watts per square inch of the ribbon of resin to be heated to a curing temperature. To accurately locate and position the panels of the assembly and induction coil or coils relative to each other, preferably the assembly is received in a set of fixtures in which the coil or coils are also mounted. To facilitate inserting and removing the sheet metal assembly, preferably at least one of the fixtures of the set may be advanced and retracted with respect to the other fixture.

When the alternating current is applied to the coil or coils, if it has a frequency of less than about 200,000 Hz, it is desirable and sometimes necessary to hold down or clamp the panels of the assembly in relation to each other and the induction coil or coils so that the panels will not vibrate and become mislocated when current is applied to the coil or coils. So that this induction heating will not result in distortion or warping of the sheet metal assembly, any clamping or holding of the assembly in the fixture should be remote from the area of the sheet metal heated by the induction coil or coils.

After the resin has been tacked to the sheet metal, the resulting assembly is subsequently heated to an elevated curing temperature for a sufficient period of time to cure the resin and thereby structurally bond the sheet metal panels together. Preferably, this heating occurs after the assembly has been painted. Both the resin can be cured to structurally bond the assembly and the paint dried and cured, by passing the painted assembly through a paint baking oven at a temperature of about 250° F. to 400° F. for about 45 to 15 minutes. This insures that both the resin and the paint are fully cured.

To facilitate processing of various panel assemblies, preferably the apparatus embodying this invention has a plurality of sets of fixtures which can be readily transferred between idle and work stations. Preferably, each set of fixtures has electrical connectors which permit the coil or coils of the set to be energized only when they are fully closed.

Objects, features and advantages of this invention are to provide a method and apparatus for tacking and subsequently curing a two stage resin in a sheet metal assembly which is very rapid and hence, highly suited for mass production operations, very energy efficient, does not significantly distort or warp the assembly, eliminates the need to rigidly clamp the assembly in fixtures, and is simple, reliable, dependable, easy to use, and does not require highly skilled labor.

BRIEF DESCRIPTION OF THE DRAWINGS

These and other objects, features and advantages of this invention will be apparent from the following detailed description, appended claims and accompanying drawings in which:

FIG. 3 is an enlarged fragmentary sectional view of a sheet metal vehicle door assembly;

FIG. 4 is an enlarged side view with portions broken away and in section of a pair or set of coil fixtures of the apparatus of FIG. 1;

FIG. 5 is a plan view of the lower fixture taken generally on line 5—5 of FIG. 4;

FIG. 6 is a plan view of the upper fixture taken generally on line 6—6 of FIG. 4;

FIG. 12 is an enlarged fragmentary sectional view of the fixtures when open and showing in detail the mounting of the coils in the fixtures;

FIG. 13 is an enlarged fragmentary sectional view similar to FIG. 12 showing a door assembly to be tacked received in the lower fixture;

FIG. 14 is an enlarged fragmentary sectional view similar to FIG. 13 showing the fixtures when closed with the door assembly therein;

DETAILED DESCRIPTION

Figure 1:
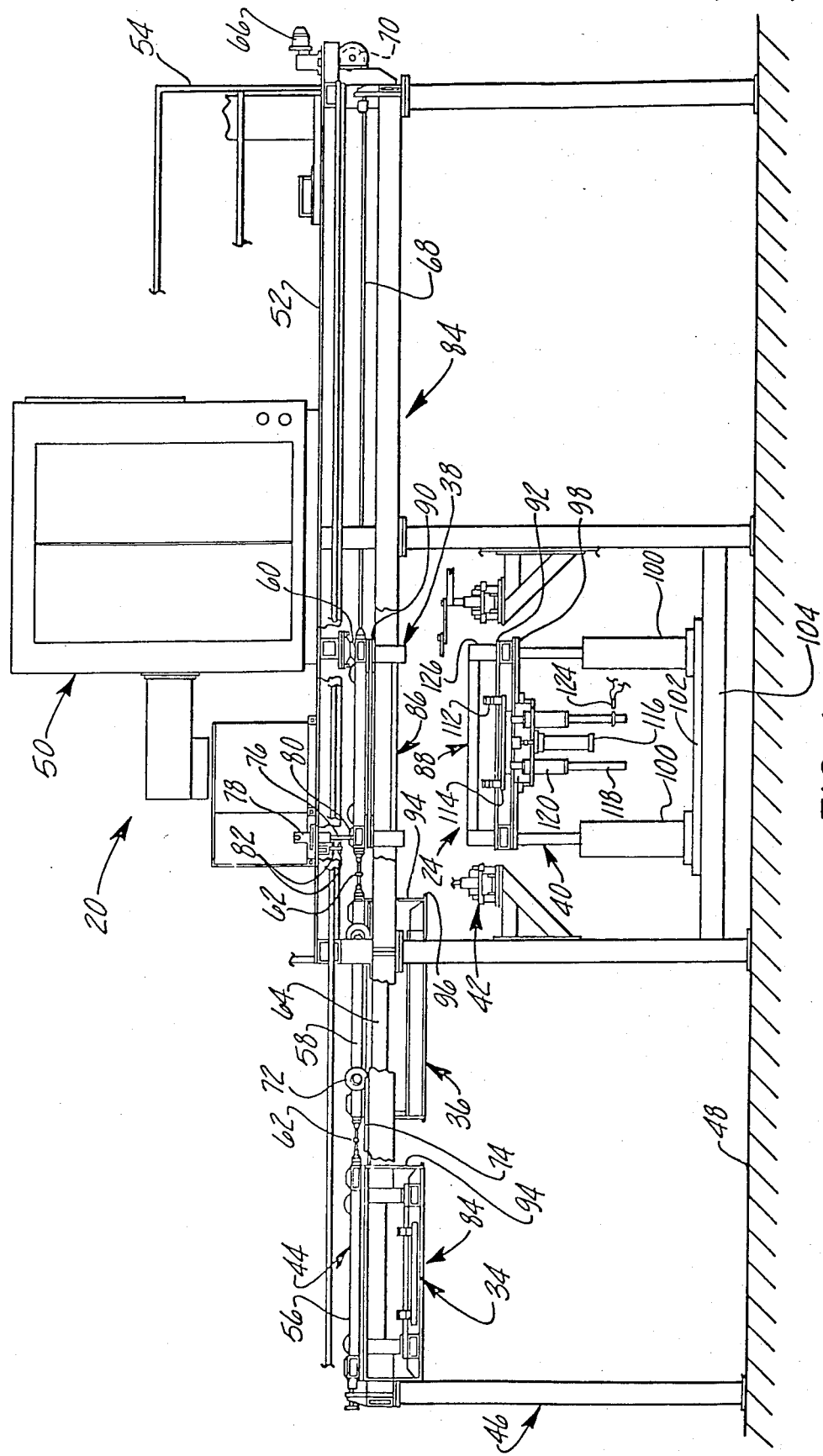
FIG. 1 is a side view with portions broken away of an apparatus for carrying out this invention.

In accordance with this invention, two overlapped sheet metal portions are structurally secured together by a ribbon of resin disposed between them to produce a sheet metal assembly. The ribbon is a two-stage resin which, in the first stage, is heat activated to tack the metal portions together and subsequently, in the second stage, is heat activated to fully cure the resin to structurally bond the metal portions together. In the first stage, the ribbon of resin adheres to the sheet metal but provides relatively low strength and after being fully cured in the second stage, structurally secures the metal portions together with comparatively high strength.

Preferably, the ribbon of plastic resin is a polyvinyl chloride and epoxy resin such as Terokol 39195 commercially available from W. R. Grace & Co., of 3221 W. Big Beaver, Troy, Mich. 48084. In the first stage, when this resin is heated to about 200° F. to 400° F. and preferably to about 300° F. to 350° F. by induction heating, the polyvinyl chloride adheres to the metal portions and becomes at least partially cured to tack the metal portions together.

In the first stage, to avoid initiation of curing of the epoxy component of the resin, preferably the resin should not be heated to a temperature higher than about 375° F. Similarly, to avoid excessive oxidation of the sheet metal and hence the problem of adhesion of paint thereto, the sheet metal adjacent the resin should only be momentarily heated and heated to a maximum temperature not greater than about 375° F. to 400° F. Only momentarily heating the adjacent portions of the sheet metal to a temperature not greater than about 400° F. also avoids distortion, discoloration and burning of the sheet metal. Thus, even if the sheet metal will not be painted or receive another surface coating or treatment, it should not be heated to a temperature greater than about 400° F.

Preferably, in the second stage, the entire assembly including both the resin and all the sheet metal panels is substantially uniformly heated throughout to a temperature in the range of about 250° F. to 400° F. Preferably, the assembly is heated to this temperature by being placed in a conventional paint baking oven for about 45 to 15 minutes. After the heated assembly is removed from the oven, preferably it is allowed to cool in ambient air to room temperature.

Alternatively, in the second stage, the resin can be heated to a curing temperature by utilizing an induction coil or coils to rapidly heat only the portions of the sheet metal immediately adjacent the ribbon of resin. Preferably, the metal portions to be heated are disposed between a pair of generally opposed induction coils extending along the ribbon of resin, disengaged and spaced from all the sheet metal and spaced about 0.03 to 0.35 of an inch from an immediately adjacent metal portion to be heated. To heat the metal portions, an alternating current with a frequency of at least about 3,000 Hz and a power of at least about 350 watts per square inch of resin is applied to the coil or coils for not more than about 15 seconds. This heats the resin to a curing temperature in the range of about 250° F. to 400° F. and preferably about 300° F. to 400° F. A suitable method and apparatus for carrying out this induction heating is disclosed in co-pending U.S. application Ser. No. 748,391 which issued on July 22, 1986, as U.S. Pat. No. 4,602,139. The disclosure of this application is incorporated herein by reference and hence this induction heating method and apparatus will not be described herein in further detail.

After being heated in this first stage to tack the metal portions together, a force in the range of about 50 to 125 pounds per square inch of resin is required to pull apart or separate the metal portions. After the resin is fully cured in the second stage to structurally bond the metal portions together, a force in the range of about 500 to 5,000 pounds per square inch of resin is required to pull apart or separate the metal portions. This pull strength is dependent on the particular resin used.

After completion of the first stage or tacking together of the metal portions, they are adhered together with sufficient strength so that the assembly can pass through other manufacturing operations, including any needed sanding, buffing, cleaning, priming, and painting of the sheet metal, and even shipping the assembly across the country by truck or rail without the panels shifting or changing location relative to each other before the resin is heated in the second stage to become fully cured and structurally secure the metal portions together.

Induction Tacking Apparatus

Figure 2:
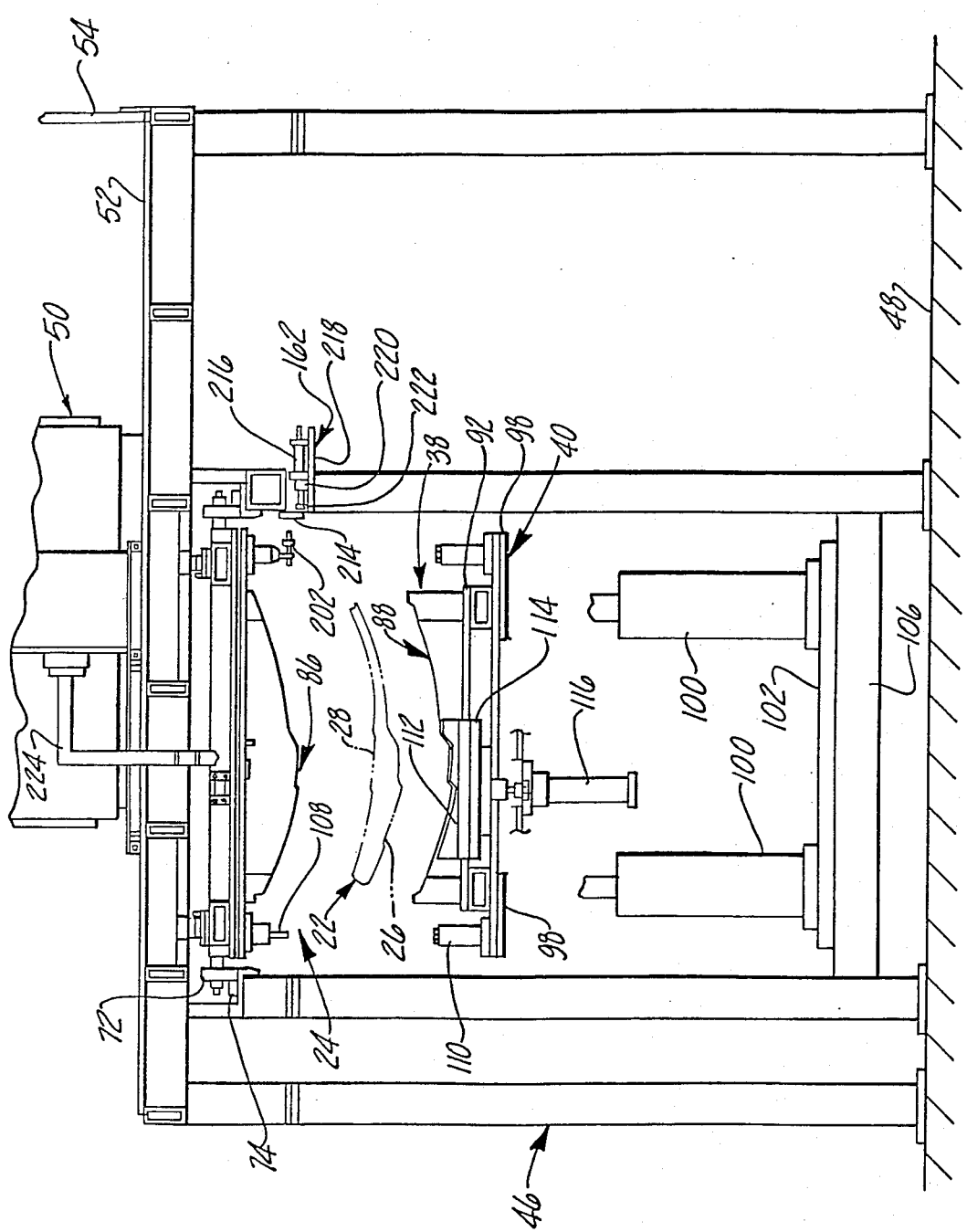
FIG. 2 is an end view with portions broken away of the apparatus of FIG. 1.
Figure 7:
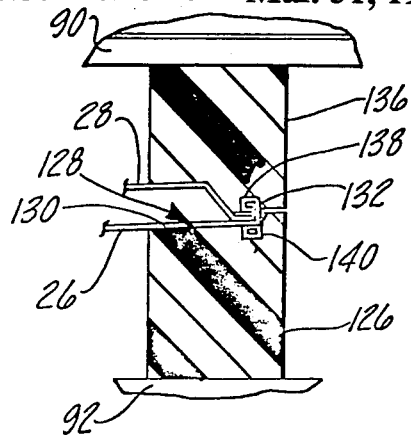
FIGS. 7, 8, 9, 10 and 11 are enlarged fragmentary sectional views of the pair or set of fixtures shown in closed relation with a vehicle door assembly therein, taken generally on lines 7—7, 8—8, 9—9, 10—10 and 11—11 of FIG. 5.
Figure 8:
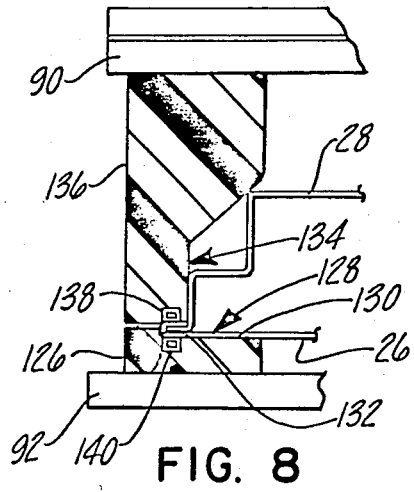
Figure 9:
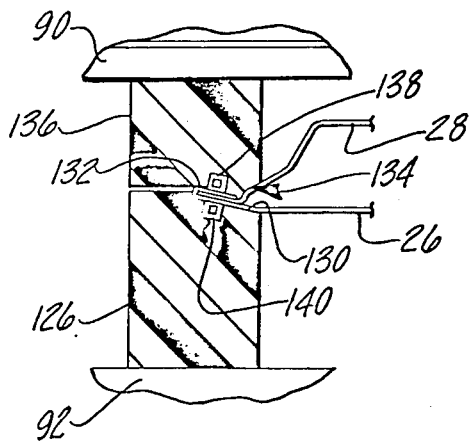
Figure 10:
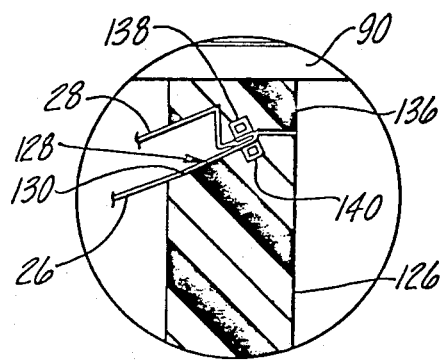
Figure 11:
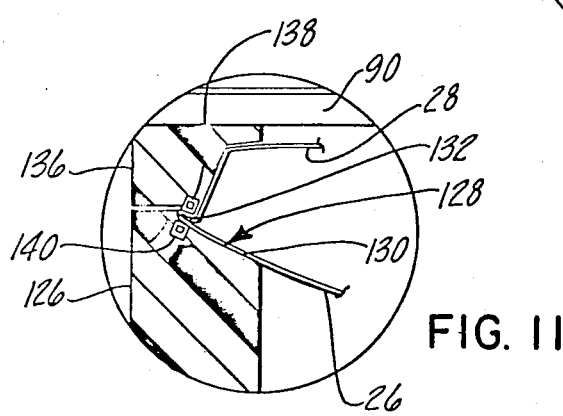

A suitable induction apparatus for rapidly heating portions of sheet metal adjacent a ribbon of resin to carry out the first stage of activating the resin to tack the panels of a sheet metal assembly together is shown in FIGS. 1-19 of the drawings. FIGS. 1 and 2 illustrate an induction heating apparatus 20 for tacking together the panels of a sheet metal assembly such as a car door 22 in a workstation 24. The door assembly has an outer sheet metal panel 26 and an inner sheet metal frame panel 28 with a hem flange 30 (FIG. 3) around its periphery. To secure the panels together a series of droplets or a ribbon of a heat activated two-stage plastic adhesive or resin 32 is disposed between the panels and momentarily heated to tack the panels together. The two-stage resin is only partially cured in the first stage to tack the panels together by being heated to an elevated temperature usually in the range of about 250° F. to 375° F. and preferably about 300° F. to 350° F. for a short period of time of about 1 to 10 seconds and preferably 2 to 6 seconds.

Portions of the door assembly adjacent the resin are heated to only partially cure the resin in one of three pairs of coil fixtures 34, 36 and 38 received in the work station. To facilitate rapidly changing the apparatus to process different size sheet metal assemblies, each set or pair of fixtures is constructed and arranged to receive a vehicle door or other sheet metal assembly having a different size, shape and/or configuration.

The set of coil fixtures in the work station is opened and closed by a lift mechanism 40. Each door assembly is moved into and out of the set of coil fixtures in the work station by a workpiece conveyor 42. The coil fixtures are moved into and out of the work station by an overhead transfer mechanism 44 carried by a frame 46 of the apparatus secured to a floor 48. A power supply cabinet 50 is received on a catwalk 52 on top of the frame and is encircled by a hand rail 54.

Transfer Mechanism

To facilitate quick and easy change over from running one sheet metal assembly to another, transfer mechanism 44 can move any one of the three pair of fixtures 34, 6 or 38 out of the work station 24 and another pair of the fixtures into the work station. The transfer mechanism moves the fixtures between the work station 24 and idle stations 84 on each side of the work station. The transfer mechanism has three carriages 56, 58 and 60 connected together by turnbuckles 62 carried by a pair of rails 64 fixed to the frame. The carriages are moved in unison by a drive motor 66 mounted on the frame and a loop of drive chain 68 received over sprockets 70 and connected at its ends to the carriages 56 and 60. Each carriage has four wheels 72 which are guided and retained on the rails by keepers 74. The carriages are accurately located in the work station by a manually actuated locator pin 76 slidably carried by a housing 78 fixed to the frame. When extended the pin 76 is received in a bushing 80 fixed to each carriage. An indication of when the pin is extended to locate and retain a carriage in the work station is provided by proximity switches 82.

Coil Fixtures

As shown in FIG. 1, each set or pair of fixtures 34, 36 and 38 has complimentary upper and lower fixtures 86 and 88 mounted on bolster plates 90 and 92. The upper fixture of each pair and its bolster plate is secured to its associated carriage 56, 58 and 60. When in an idle station, the lower fixture of each pair is suspended from its upper fixture by hanger straps 94 secured to the fixtures by cap screws 96. When a pair of fixtures is in the work station, the hanger straps 94 are removed and the lower fixture is secured to a platen 98 of the lift mechanism 40. To close and open the fixtures in the work station, the platen is raised and lowered by hydraulic cylinders 100 secured to a mounting plate 102 secured to cross beams 104 and 106 fixed to the frame 46. When closed, the upper and lower fixtures of each pair are accurately aligned by opposed locator pins 108 and bushings 110 fixed to their bolster plates.

Each door assembly is lifted from the workpiece conveyor 42 by a pre-lift cradle 112 secured to a table 114 which is carried by the lift mechanism 40. The cradle and table are raised and lowered by a hydraulic cylinder 116 secured to the platen 98. The table is guided by a pair of rods 118 fixed thereto and slidably received in bushings 120 fixed to the platen. The raised and lowered positions of the table are sensed by proximity switches 122 and 124.

As the lower fixture is raised by the lift mechanism 40, the cradle 112 is retracted so that the lower fixture picks up the sheet metal door assembly 22 from the cradle and positions it between the closed fixtures to be tacked. After the panels of the assembly are tacked together by the resin, the lift mechanism 40 is lowered to open the fixtures, while the cradle 112 is raised to lift the tacked assembly from the lower fixture so that it can be carried away by the workpiece conveyor.

In accordance with another feature of this invention, panels of the sheet metal assembly to be tacked are accurately located by the pair of fixtures 34, 36 or 38 in the work station when closed without firmly or securely clamping the panels in the area in which they are to be tacked. The sheet metal door assembly 22 is supported in the lower fixture 88 by an upstanding wall 126 which extends around and underlies the periphery of the door assembly. To accurately locate the door assembly 22 in the lower fixture, it is received in a recess 128 in the upper face of the wall 126. As shown in FIGS. 7-11, the recess has a bottom face 130 with a contour complimentary to and mating with an overlying portion of the outer panel 26 of the door and a sharp edge 132 extending around and closely adjacent to the peripheral edge of the door. To further facilitate accurately locating the panels of the door assembly, preferably the upper fixture also has a recess 134 in a depending peripheral wall 136 which is complimentary to and mates with an underlying portion of the inner frame panel 28 of the door assembly.

In accordance with another feature of this invention, as shown in FIGS. 7-11 and 14, each pair of fixtures, when closed, positions induction coils on generally opposite sides of the sheet metal assembly adjacent the ribbon of plastic resin to be tacked. The upper and lower fixtures each have an induction coil 138 and 140 received in a groove 142 and 144 in the upper and lower peripheral walls 126 and 130 of the fixtures. The induction coils extend longitudinally generally along the path of the ribbon of plastic resin to be heated. The coils are of an electrically conductive material such as copper and in the form of a hollow tube so that a cooling fluid, such as water, can be circulated through them to prevent them from becoming over heated when in use.

As shown in FIGS. 12–14, preferably the coils are mounted in the grooves by spaced apart tabs 142 secured by machine screws 144 and then potted in the grooves with an electrically insulating material 146 such as RTV rubber. To insure that the portion of the door assembly received between the fixtures is not rigidly clamped, preferably the potting material 146 in at least the upper fixture is resilient or elastic and is the only portion of the upper fixture which directly bears on the door assembly in the area to be bonded. Another way of insuring that the fixtures do not rigidly clamp the sheet metal assembly is to provide a slight clearance between the upper fixture and the door assembly in the area to be bonded.

To further insure that the induction coils are electrically insulated from each other, the door assembly, and operating personnel, preferably the peripheral walls 126 and 136 of the fixtures are also made of an electrically insulating material and completely enclose the coils and the door assembly. These walls should also be rigid and able to withstand without deterioration elevated temperatures of up to about 400° F. A suitable material for making these walls is an epoxy resin sold under the trade name Haysite by the Haysite Reinforced Plastics Division of Zurn Industries, Inc. of 5599 Newperry Highway, Erie, Pa. 16509.

Location of Coils

In accordance with a further feature of this invention, each coil is spaced from the door panel assembly to maximize its effectiveness and efficiency in generating heat in those portions of the sheet metal from which the heat will be most effectively transferred to the plastic resin to be tacked. As shown in FIG. 14, heat will be most efficiently transferred to the resin 32 from the underlying portion 148 of the outer metal panel 26 and the overlying portion 150 of the inner frame panel 28. The spacing between a piece of metal and an induction coil at which the metal is most effectively and efficiently heated, is primarily a function of the frequency of the alternating current applied to the coil and the size in cross section of the coil. Thus, for upper and lower coils 138 and 140 of the same cross sectional size to which power of the same frequency is applied, the distance 152 between the lower coil and the metal portion 148 should be substantially equal to the distance 124 between the upper coil and the metal portion 150 to maximize the effectiveness and efficiency of heating the resin. For coils having a square cross section of about one-quarter inch on a side, the distances 152 and 154 are usually in the range of about 0.350 to 0.030 of an inch, typically about 0.250 to 0.040 of an inch, and preferably about 0.120 to 0.060 of an inch for a frequency of the alternating current applied to the coils in the range of about 5 KHz to 1,000 KHz with the distance decreasing as the frequency increases. Typically, with this size coils and current having a frequency of about 500 KHz this distance is usually about 0.100 of an inch. As exaggerated in FIGS. 12–14, for a hem flange the most effective and efficient spacing of the coils results in the lower and upper coils being located at different distances from the exposed or outer faces of the hem flange. Usually it is desirable to empirically determine the exact distances 152 and 154 for a given size and configuration of lower and upper coils, door assembly, resin location in the hem flange, and frequency and power of alternating current applied to the coils.

When tacking together the panels of a sheet metal assembly having a sharp bend, sometimes the coils cannot be spaced a uniform distance from the metal to be heated in the area of the bend which results in localized spots or areas of the sheet metal being too close to one of the coils and hence, being excessively heated to a temperature which burns the resin and/or metal and distorts the metal. To prevent excessive heating in these localized areas, a small portion of one or both of the coils can be shielded with a ferrite material or laminated steel plates to decrease the amount of energy radiated by the coils and hence eliminate the localized spot or area of excessive heating. A suitable ferrite material is sold under the trade name Ferrocon by Polymer Corporation of Reading, Pa. 19603.

Electric Disconnector

To insure the safety of personnel operating the apparatus, the induction coils 138 and 140 of only the pair of fixtures in the work station are electrically connected by a disconnector 156 so that a current can be applied to the coils only when the fixtures are closed. As shown in FIG. 2, the disconnector 156 has a plug 158 carried by the upper fixture, a receptacle 160 carried by the lower fixture, and an actuator 162 mounted on the frame 46. As shown in FIGS. 5 and 15–17, the plug 158 has a pair of spaced apart copper conductor pins 164 and 166 mounted on a carrier block 168 of electrically insulating material such as epoxy resin secured by cap screws to the bolster plate of the lower fixture. One end of the upper coil 138 is electrically connected to the conductor pin 166 by a conduit or buss 170 and the other end of the coil is connected to the power supply by a conduit or buss 172. The other pin 164 is also connected to the power supply by a conduit 174. The conduits 172 and 174 are separated by a strip 176 of an electrically insulating material such as teflon. The conduits are hollow tubes of copper through which a cooling fluid such as water is circulated.

Figure 15:
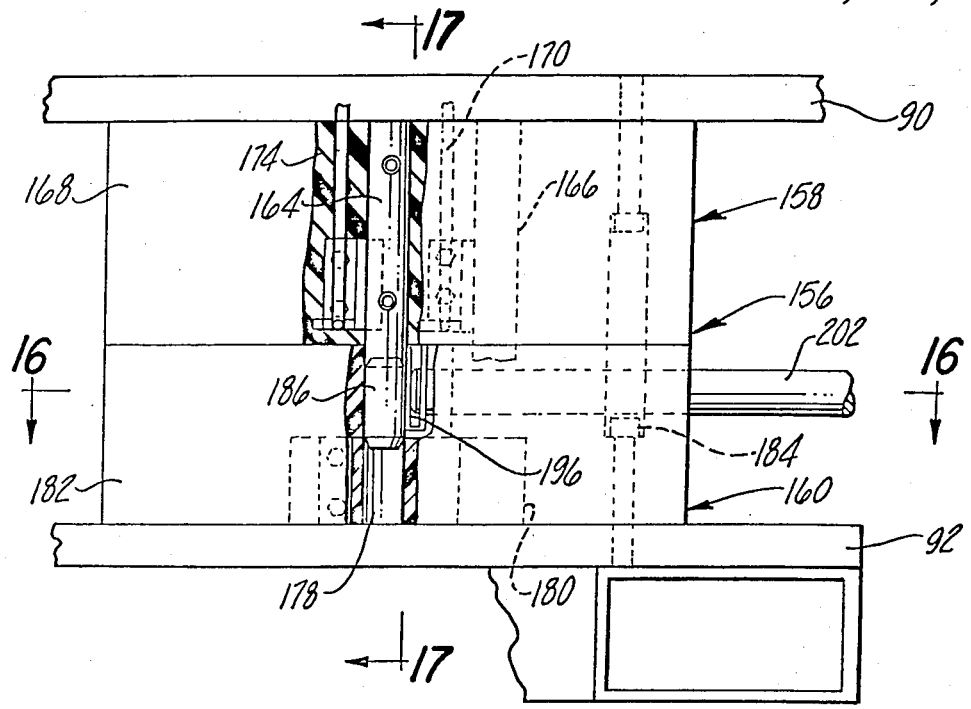
FIG. 15 is a fragmentary side view of an electric connector for the coils of the pair or set of fixtures of FIG. 4.

When the fixtures are closed, the pins 164 and 166 of the plug project into socket holes 178 and 180 in a block 182 of an electrically insulating material such as epoxy of the receptacle 160. The block 182 is secured by cap screws 184 to the bolster plate of the upper fixture. As shown in FIGS. 13–15 the receptacle also has a pair of copper conductor pins 186 and 188 received in blind holes in the block and each extending generally parallel to and spaced from the plug pins 164 and 166. The receptacle pin 186 is electrically connected to one end of the lower coil 140 by a conduit 190. The other end of the lower coil is connected to the other pin 188 by a conduit 192. The conduits are separated by a strip 194 of teflon, and are hollow tubes of copper through which a cooling fluid such as water is circulated.

Figure 16:
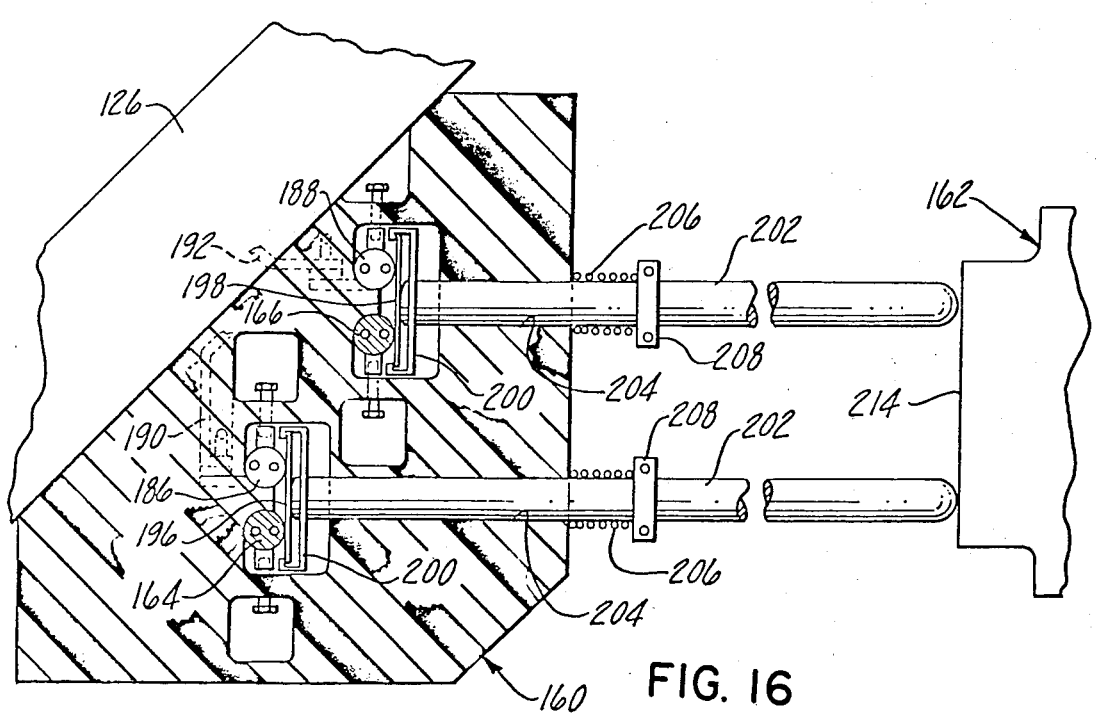
FIG. 16 is a fragmentary sectional view of the electric connector taken generally on line 16—16 of FIG. 15.
Figure 17:
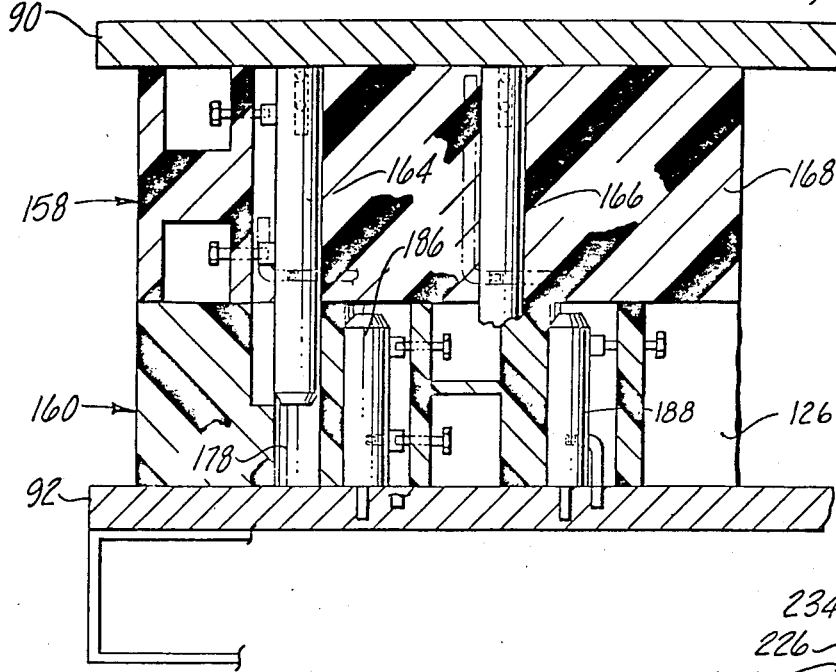
FIG. 17 is a fragmentary sectional view of the electric connector taken generally on line 17—17 of FIG. 15.

When the fixtures are closed so that the pins of the plug extend into the receptacle, the coils are connected in series with each other by movement of a beryllium copper alloy contactor plate 198 into simultaneous engagement with the pins 164 and 186 and movement of a beryllium copper alloy contactor plate 198 into simultaneous engagement with the pins 166 and 188. Each contactor plate is removably mounted in a carrier 200 of an insulating material which is connected to one end of an actuator rod 202 slidably received in a bore 204 in the mounting block. Each contactor plate is yieldably urged away from its associated conductor pins by a coil spring 206 received on the rod with its ends bearing on the block and a clamp 208 secured to the rod. To limit the extent in which each actuator rod can move away from the conductor pins an adjustable collar 210 is secured to the rod to bear on a block 212 in which the rod is also journaled. As shown in FIGS. 2 and 16, when the fixtures are closed, the rods 202 can be advanced to close the contactor plates by the actuator 162. The actuator has a pressure pad 214 which is advanced and retracted by a pneumatic cylinder 216 received on a mounting plate 218 fixed to the frame 46. Movement of the actuator to close and open the contactor plates is sensed by proximity switches 220 and 222.

Figure 18:
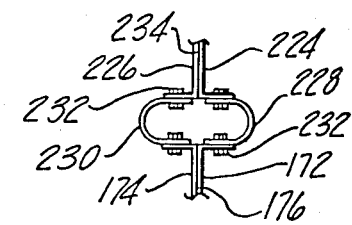
FIG. 18 is a fragmentary side view of shunts connecting the coils to a power supply.

As shown in FIGS. 2 and 18, to facilitate connecting and disconnecting each pair of fixtures 34, 36 and 38 with the power supply, the conduits 172 and 174 of each upper fixture are connected to power supply copper conduits 224 and 226 by flexible copper shunts 228 and 230 releasably secured to the conduits by bolts and nuts 232. The power supply conduits are hollow tubes through which a cooling fluid is circulated and are separated by a strip of electrically insulating material 234 such as teflon.

Power Supply

In accordance with another feature of this invention, to rapidly heat only the portions of the door assembly immediately adjacent the resin a preferably high frequency alternating current is applied to the coils at a high energy level or power for a short period of time. For applications where very rapid heating is unnecessary a current with a frequency of about 5,000 Hz can be used. For applications where rapid heating is desirable or necessary, an alternating current is used with a radio frequency of usually at least 50 KHz, desirably in the range of 100 to 1000 KHz, and preferably about 200 to 700 KHz. The energy level or power of this current is about 350 to 1250, desirably about 500 to 1000, and preferably 650 to 850 watts per square inch of the ribbon of resin. This high frequency current is applied for only a short period of time of not more than about 15 seconds, desirably less than 10 seconds, and preferably about 1 to 6 seconds.

Figure 19:
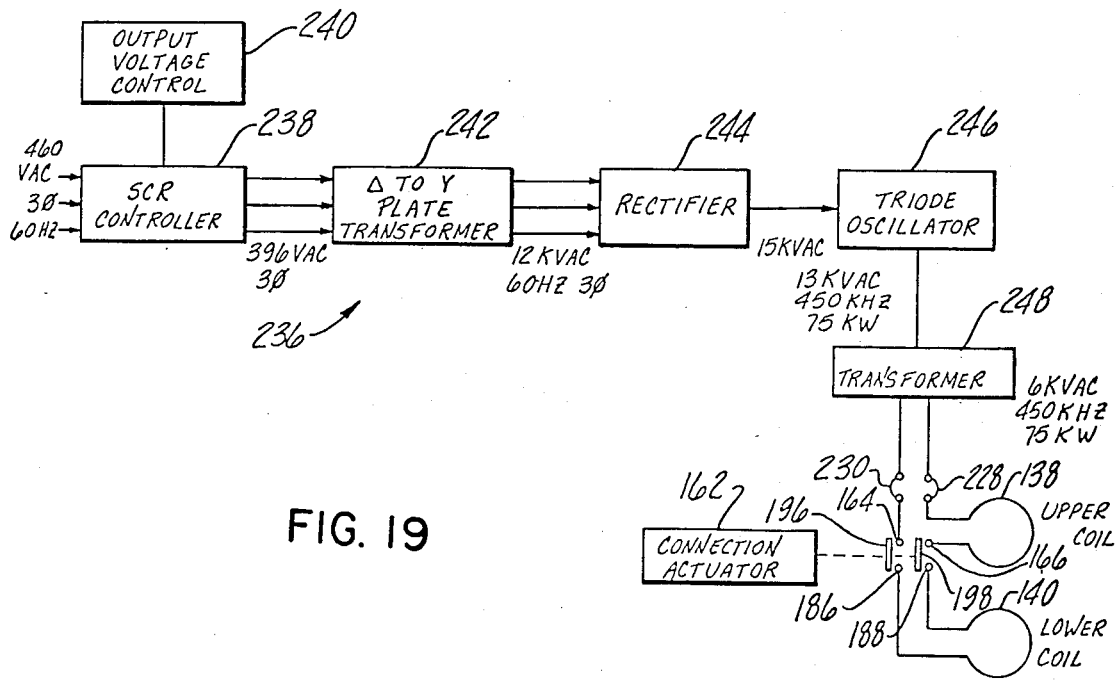
FIG. 19 is a block diagram of a power supply producing a high frequency alternating current supplied to the coils of the fixtures.

A suitable power supply 236 for producing this alternating current is housed in the cabinets 50. The coils are preferably connected in series with this power supply although they can be connected in parallel. A block diagram of this power supply 236 is shown in FIG. 19 in which utility or plant electric power at 460 volts AC, 60 Hz and three phase is fed to a water cooled SCR controller 238 through suitable circuit breakers, interrupters and filter capacitors (not shown). Preferably, this SCR controller is a model 304-087-6 controller and model 359-027 current limiter marketed by the Robicon Division of Barber Coleman Company of P.O. Box 360247M, Pittsburgh, Pa. 25251. The controller 238 provides a regulated nominal output of 396 volts AC independent of voltage variations of up to ±10% in the three input phases. A manually variable control 240 adjusts or "fine tunes" the output voltage of the controller and hence, the overall power supply 236.

The three phase output of the SCR controller is fed to the primary windings of a Delta-to-Wye plate transformer 242 through surge suppressors (not shown). The secondary windingns of the transformer 242 supply three phase power at 12,000 volts AC and 60 Hz to a rectifier bank 244 which is a series of diodes. The output of the rectifier bank of 15,000 volts DC is fed to a water cooled triode oscillator having a resonant tank circuit which includes a primary winding of a single phase transformer 248. The secondary winding of the transformer 248 is connected to the upper and lower coils in series, when the fixtures are closed and connected by the lug 158, receptacle 160, and contactor actuator 162. Thus, the transformer 248 and the induction coils form part of the oscillator tank circuit.

The triode of the oscillator has a grid electromagnetically connected to the tank circuit which causes the oscillator to resonate in tune with the tank circuit. The resonance turns the output of the triode on and off rapidly to produce a single phase alternating current having a high frequency in the range of about 50 KHz to about 500 KHz.

The turns ratio of the primary windng to the secondary winding of the transformer 248 is selected to match the load created by the induction coils and the sheet metal assembly being heated by them. The turns ratio is usually in the range of about 5:1 to 2:1. For example, in one working embodiment the turns ratio is 13:6 so that the output of the oscillator of 13,000 volts AC, 450 KHz at 75 KW is stepped down by the transformer 248 to 6,000 volts AC, 450 KHz, 75 KW which is applied to the induction coils when connected in series. The alternating current is applied to the coils to heat the resin of a sheet metal assembly for a short period of time or cycle of less than about 15 seconds, often less than 5 seconds and frequently less than 2 seconds.

The tacking apparatus 20 also has a number of electric and electrohydraulic circuits and components for cycling and operating it which have not been described because they are unnecessary for a complete understanding of this invention.

Setup and Use

In use, apparatus 20 is connected to a suitable source of hydraulic fluid under pressure, air under pressure, and to plant or utility electric power. The apparatus is set up to tack together the panels of a sheet metal assembly such as the vehicle door 22 by moving the appropriate pair of fixtures such as the pair 38 into the work station 24. The desired set of fixtures is transferred into the work station and the remaining sets of fixtures into idle stations by energizing the motor 66 to move the carriages 56, 58 and 60 along the rails 64 so that the carriage 60 with the set of fixtures 38 is in the work station 24. After the motor 42 is de-energized, the carrier 60 and the pair of fixtures 38 are accurately located and retained in the work station by manually advancing and engaging the locator pin 52 in the bushing 80 in the carriage. The lower fixture 88 is released from the upper fixture 86 by removing the hanger straps 94 and is secured by bolts (not shown) to the platen 98 of the lift mechanism 40.

With the lift mechanism 40 and pre-lift cradle 112 lowered by retraction of the pistons in the cylinders 100 and 116 as indicated by the proximity switch 124, a sheet metal door assembly 22 to be tacked is transferred between the open fixtures by the workpiece conveyor 42. The pre-lift cradle 112 is advanced by energizing cylinder 116 to lift the door assembly from the conveyor 42, and then the lower fixture is raised by energizing cylinders 100 to close the fixtures with the door assembly therebetween while lowering the pre-lift cradle 112. Closing of the fixtures also inserts the conductor pins of the plug 158 into the receptacle 160. After the fixtures are closed, the coils 138 and 140 of the fixtures are electrically connected to the output of the power supply 236 through the secondary of the transformer 248 by energizing the air cylinder 216 of the actuator 162 to advance the rods 202 to force the contactor plates 196 into engagement with the conductor pins of the plug and receptacle.

After the proximity switch 222 indicates the contactor rods and plates are advanced and hence the coils are electrically connected, a high frequency current produced by the power supply 236 is applied to the induction coils 136 and 138 for a short period of time, preferably less than 5 seconds, to heat the plastic resin 32 in the door assembly to a tacking temperature activating the first stage of the resin. The induction coils heat the metal portions 148 and 150 of the door assembly adjacent the ribbon of resin 32 to an elevated temperature and at least a portion of the heat is transferred, primarily by conduction, to the ribbon of resin which causes the resin to become only partially cured in its first stage.

After the cycle time for energizing the coils is completed, the current from the power supply is switched off by a relay or other switching device (not shown) and then the contactor actuator 162 is retracted by energizing air cylinder 216 to retract its piston. After the proximity switch 220 indicates the actuator 162 is retracted, the fixtures are opened by energizing the cylinders 100 to move the lower fixture 140 away from the upper fixture 138. As the fixtures are opened, the cradle 112 is raised to lift the bonded assembly from the lower fixture by energizing the hydraulic cylinder 116 to advance its piston. The tacked door assembly is lifted sufficiently from the lower fixture so that it can be engaged and removed from the work station by the workpiece conveyor 42. Thereafter, another door assembly 22 to be tacked is transferred between the open fixtures by the workpiece conveyor 42 and another cycle of the tacking apparatus 20 is initiated.

Modified Apparatus and Fixture

Figure 20:
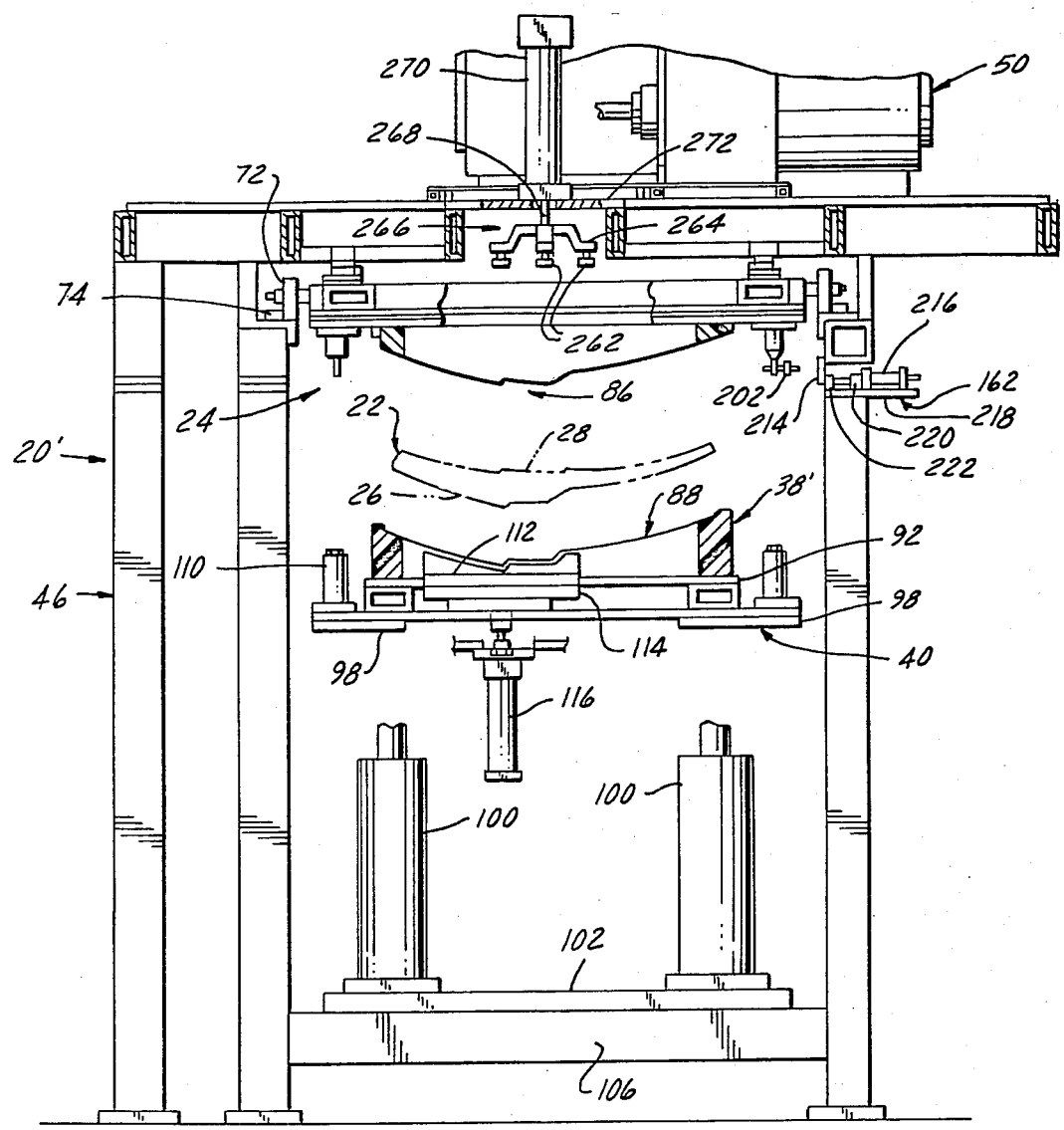
FIG. 20 is an end view with portions broken away of a modified form of the apparatus of FIG. 1.
Figure 21:
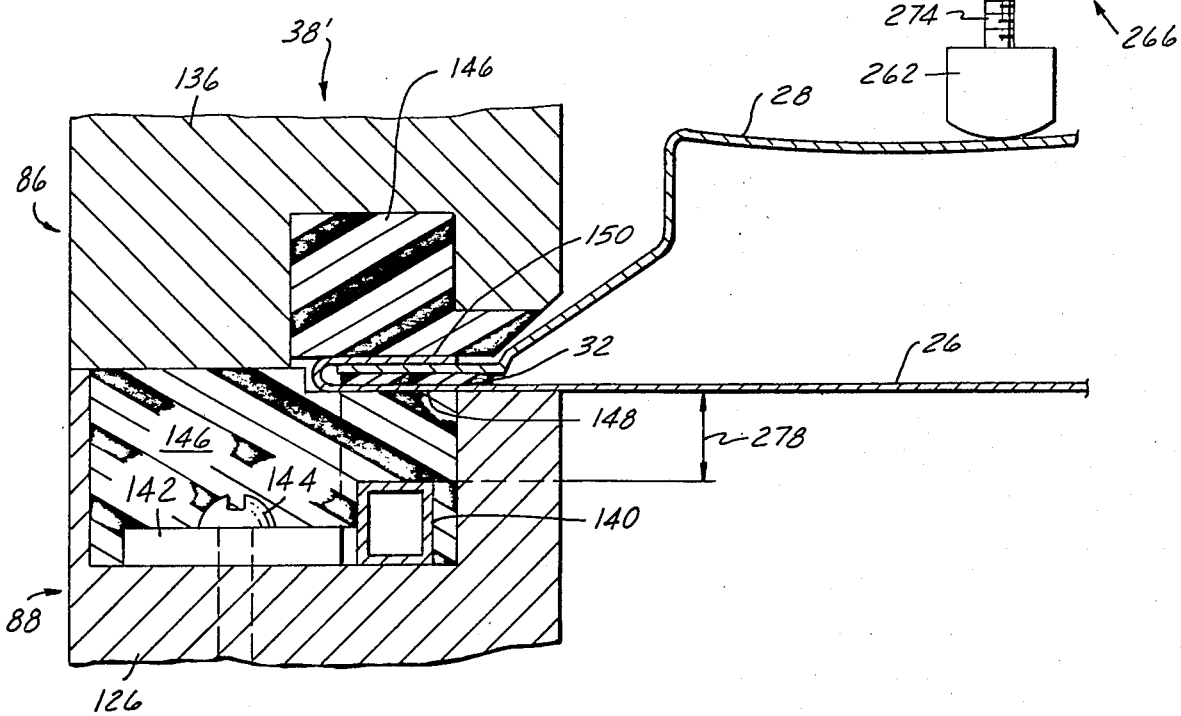
FIG. 21 is an enlarged fragmentary sectional view of a door assembly to be tacked received in fixtures of the modified apparatus of FIG. 20.

FIGS. 20 and 21 illustrate a modified form 20' of the tacking apparatus 20 and a fixture 38' in which only one induction coil 140 is used to heat the resin. To prevent the panels of the door assembly 22 from vibrating when a current having a frequency of less than about 200,000 Hz is applied to the coil 140, the apparatus has a hold down or clamp assembly 260.

Hold down assembly 260 has four rubber bumpers 262 each mounted on an arm 264 of a spider 266 secured to a piston rod 268 of a pneumatic cylinder 270. The cylinder is mounted on a carrier plate 272 fixed to the frame 46 of the apparatus 20'. Preferably, as shown in FIG. 21, each bumper is mounted on its associated leg so it can be adjusted generally vertically by a threaded stud 274 received in a threaded hole in the leg and retained in adjusted position by a lock nut 276. The legs of the spider 266 are constructed and arranged so that the bumpers contact the door assembly 22 a points remote from the ribbon of resin 32 to be tacked to the panels 26 and 28 by the apparatus 20'. This insures that the sheet metal panels will not be fixedly clamped or secured in the areas in which the resin is to be tacked to the panels.

When a single coil 140 is used, the current applied to the coil usually has a power in watts per square inch of resin which is 25% to 40% greater and preferably about 30% to 35% greater than the power in watts per square inch of resin applied to the two coil fixtures of apparatus 20. With the single coil 140 the distance 278 between the adjacent face of the coil 140 and the point half way between the faces of the two sheet metal portions contacting the ribbon of resin is usually in the range of about 0.350 to 0.030 of an inch, typically about 0.250 to 0.040 of an inch, and preferably about 0.120 to 0.060 of an inch for a coil having a square cross section of about ¼" on a side.

Preferably, to facilitate proper location of the assembly 22 in the fixture and decrease the tendency of the panels 26 and 28 to vibrate while still insuring they are not rigidly clamped to the fixture, the upper fixture section 86 has an electrically insulating and resilient material 146, such as RTV rubber in the upper groove 142, even though there is no induction coil mounted therein. If desired, only an open lower fixture can also be used to locate the assembly 22 so that in effect the upper portion 86 of the fixture 38' would be eliminated and only the lower portion 88 would be used.

Power Supply

When a single coil is used preferably the alternating current applied to the coil has a frequency of less than 200,000 Hz and typically in the range of about 3,000 Hz to 50,000 Hz.

Figure 22:
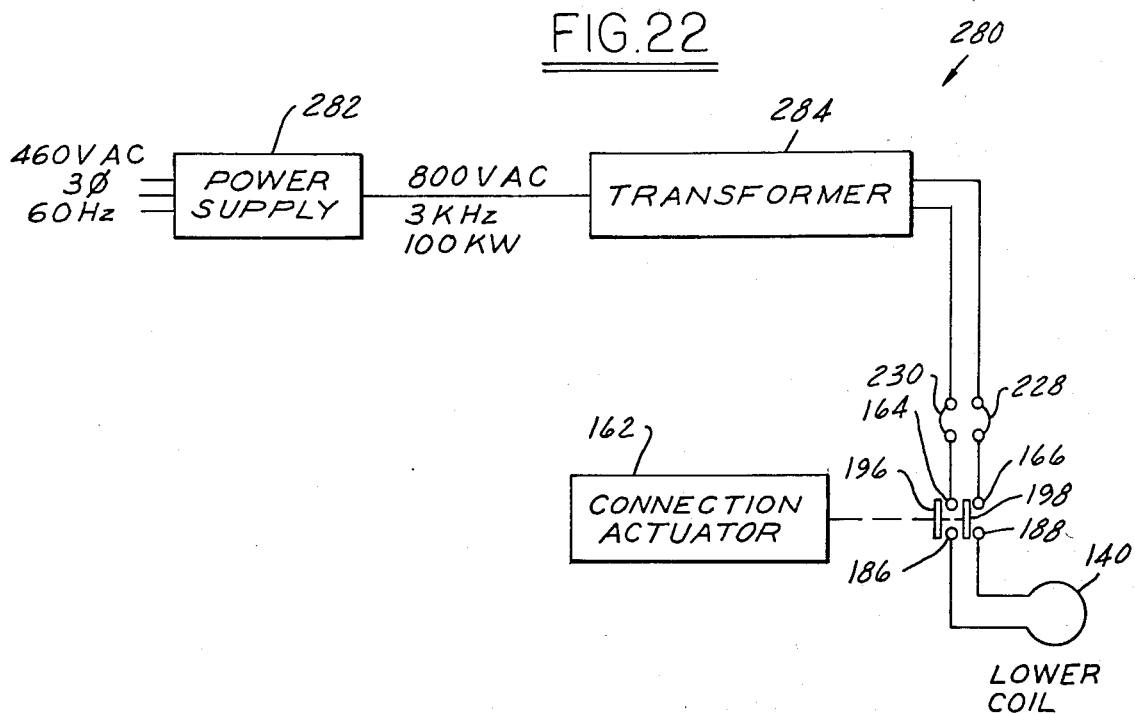
FIG. 22 shows the power supply arrangement.

A suitable power supply 280 for the apparatus 20' is shown in the block diagram of FIG. 22. Utility or plant electric power at 460 volts AC, 60 Hz and three phase is fed to a solid state power supply 282 which produces a single phase output alternating current at a frequency of 3 or 10 KHz at 800 volts AC and 100 KW. A suitable power supply 282 is commercially available from IPE Cheston of 32251 North Avis Drive, Madison Heights, Mich. 48071.

The output of the power supply 282 is fed to the primary winding of a single phase transformer 284. The secondary winding of the transformer 284 is connected to the coil 140. The turns ratio of the primary winding to the secondary winding of the transformer 284 is selected to match the load created by the induction coil 140 and the sheet metal being heated by it. This turns ratio is usually in the range of about 15:1 to 5:1. For example, in one working embodiment, the turns ratio is 10:1 so that the output of the power supply of 800 volts AC, 3 KHz at 100 KW is stepped down by the transformer 284 to 80 volts AC, 3 KHZ at 100 KW which is applied to the induction coil 140.

Use of Modified Apparatus

In use of apparatus 20' after the assembly 22 is received and located in the lower fixture portion 88, hold down assembly 260 is actuated to bear on the metal panel 28 to prevent the panels from vibrating when current is applied to the coil 140 by the power supply 280, and hence they retain their desired dimensional or positional relationship to each other. The hold down assembly is actuated by supplying air under pressure to the pneumatic cylinder 270 through conventional electropneumatic circuitry (not shown). After the current has been applied to the coil 140 to heat the ribbon of resin 32 so that it will tack the panels 26 and 28 together, the hold down assembly 260 is released and its bumpers 262 disengaged from the assembly 22 by energizing the conventional electropneumatic circuitry to retract the piston and rod 268 of the cylinder. The function and manner of operation of the modified apparatus 20' and fixture 38' will not be described in further detail since it is substantially the same as the function and operation of the apparatus 20 and the fixture 38.

What is claimed is:

1. A method of initially tacking and subsequently bonding together in an assembly at least two overlapped portions of sheet metal with a ribbon of a two-stage plastic resin therebetween, which method comprises:

disposing at least one induction coil of an electrically conductive metal adjacent a portion of sheet metal bearing on a ribbon of two stage plastic resin with the coil extending generally along and adjacent the ribbon of resin and lying closely adjacent to at least one of the overlapped sheet metal portions and disengaged and spaced from all of the sheet metal portions;

applying to said coil an alternating current for a period of time for not more than fifteen seconds and at a frequency of at least about 3,000 Hz to heat by induction to a maximum temperature in the range of 200° F. to 400° F. only portions of the sheet metal immediately adjacent the ribbon of resin and the ribbon of resin to activate and initiate curing of only the first stage and not the second stage of the resin to thereby only tack the resin to the sheet metal and not structurally bond the sheet metal portions together;

supporting the assembly with overlapped portions of sheet metal and the ribbon of resin in such relationship to said coil without any substantial restraining of the overlapped portions of the sheet metal so they can flex and move due to being heated to an elevated temperature by the current applied to said coil and while subsequently cooling sufficiently for the resin to adhere to and tack them together;

removing the assembly from such relationship with said coil; and subsequently heating the resin tacked to the sheet metal portions to a maximum temperature of not more than about 400° and for a sufficient period of time to fully cure the ribbon of resin to structurally bond the two overlapped sheet metal portions together without any significant distortion or warping of the assembly.

2. The method of claim 1 wherein the current applied to said coils has a frequency of at least about 50,000 Hz and a power of at least about 350 watts per square inch of the ribbon of resin to be tacked to the sheet metal portions.

3. The method of claim 1 wherein said coil is spaced about 0.03 to about 0.35 of an inch from an adjacent one of the metal portions engaging the ribbon of resin.

4. The method of claim 1 wherein the current applied to the coil has a frequency of less than 200,000 Hz and which also comprises engaging the sheet metal assembly in an area spaced and remote from the ribbon of resin at least while the current is applied to the coil to prevent vibration of the sheet metal assembly.

5. The method of claim 1 which also comprises applying paint to the sheet metal assembly after the ribbon of resin has been heated by application of the current to the coil to tack the resin and the assesmbly removed from such relationship with the coil and before the subsequent heating of the resin tacked to the sheet metal portions to cure the resin and structurally bond the overlapped sheet metal portions of the assembly together.

6. The method of claim 1 wherein after removal of the sheet metal assembly from such relationship with the coil the ribbon of resin tacked to the sheet metal portions is subsequently cured by heating the entire assembly to a temperature in the range of about 250° F. to 400° F. for about 45 to 15 minutes.

7. The method of claim 6 which also comprises applying paint to the sheet metal assembly after the ribbon of resin has been heated by application of the current to the coil to tack the resin and the assembly removed from such relationship with the coil and before the subsequent heating of the entire assembly to cure the resin and structurally bond the overlapped sheet metal portions of the assembly together.

8. The method of claim 1 wherein after removal of the sheet metal assembly from such relationship with the coil the ribbon of resin tacked to the sheet metal portions is subsequently cured by placing the entire assembly in a baking oven for 45 to 15 minutes while such oven is operating at a temperature in the range of 250° F. to 400° F.

9. The method of claim 8 which also comprises applying paint to the sheet metal assembly after the ribbon of resin has been heated by application of the current to the coil to tack the resin and the assembly removed from such relationship with the coil and before the subsequent heating of the entire assembly to cure the resin and structurally bond the overlapped sheet metal portions of the assembly together.

10. The method of claim 1 wherein after removal of the sheet metal assembly from such relationship with the coil the ribbon of resin tacked to the sheet metal portions is subsequently heated to cure the resin and structurally bond together the overlapped metal portions of the sheet metal assembly by disposing at least one second induction coil of an electrically conductive metal adjacent one of the sheet metal portions contacted by the ribbon of resin and extending generally along the ribbon of resin and disengaged and spaced from all of the sheet metal portions, applying to the second induction coil an alternating current for a period of time of not more than fifteen seconds and at a frequency of at least 3,000 Hz to heat by induction to a maximum temperature in the range of 200° F. to 400° F. only the portions of the sheet metal immediately adjacent the ribbon of resin, and supporting the sheet metal assembly with the overlapped sheet metal portions and ribbon in such relationship to the second coil without substantially restraining the overlapped sheet metal portions from flexing and moving due to being heated to an elevated temperature by the current applied to the second coil, whereby the ribbon of resin is raised to a curing temperature so that the overlapped sheet metal portions will be structurally bonded together without any significant distortion or warping of the sheet metal assembly.

11. The method of claim 10 wherein the current applied to the second coil has a frequency of at least about 50,000 Hz and a power of at least about 350 watts per square inch of the ribbon of resin.

12. The method of claim 1 wherein after removal of the sheet metal assembly from such relationship with the coil the ribbon of resin tacked to the sheet metal portions is subsequently heated to a curing temperature by disposing a pair of second induction coils of an electrically conductive metal in spaced apart and generally opposed relation to each other and on generally opposite sides of the overlapped sheet metal portions with the resin therebetween with each of the second coils extending generally along and adjacent the ribbon of resin, lying closely adjacent to at least one of the overlapped sheet metal portions and disengaged and spaced from all of the sheet metal portions, applying to both of the second coils an alternating current for a period of time of not more than fifteen seconds and at a frequency of at least 3,000 Hz to heat by induction to a maximum temperature in the range of 200° F. to 400° F. only the sheet metal portions immediately adjacent the ribbon of resin, and supporting the assembly with the overlapped sheet metal portions and the ribbon of resin in such relationship with the second coils without any substantial restraining of the overlapped sheet metal portions from flexing and moving due to being heated to an elevated temperature by the current applied to the second coils and while subsequent cooling, whereby the ribbon of resin is raised to a curing temperature so that the overlapped sheet metal portions will be structurally bonded together without any significant distortion or warping of the assembly.

13. The method of claim 12 wherein the current applied to the second coils has a frequency of at least 50,000 Hz and a power of at least 350 watts per square inch of the ribbon of resin.

14. The method of claim 13 which also comprises applying paint to the metal assembly after the ribbon of resin has been heated by application of the current to the first coil to tack the resin and the assembly removed from such relationship with the first coil and before the subsequent heating of the entire assembly by the second coils to cure the resin and structurally bond the overlapped sheet metal portions of the assembly together.

15. An apparatus for initially tacking together at least two overlapped portions of sheet metal with a ribbon of a two-stage resin therebetween which can be subsequently activated to structurally bond together the sheet metal portions in an assembly, which apparatus comprises:
 a fixture, locator means carried by said fixture and constructed and arranged to position and locate at least two overlapped sheet metal portions relative to an induction coil,
 at least one induction coil of an electrically conductive metal carried by said fixture, said coil being constructed and arranged so that when the sheet metal portions are positioned and located by said fixture said coil is adjacent one of the sheet metal portions bearing on the ribbon of resin with said coil extending generally along and adjacent the ribbon of resin and lying closely adjacent to at least one of the overlapped sheet metal portions and disengaged and spaced from all of the sheet metal portions;
 a power supply constructed and arranged to apply to said coil an alternating current for a period of time of not more than fifteen seconds and at a frequency of at least about 3,000 Hz to heat by induction to a maximum temperature in a range of 200° F. to 400° F. only portions of the sheet metal immediately adjacent the ribbon of resin and the ribbon of resin to activate and initiate curing of only the first stage and not the second stage of the resin to thereby only tack the resin to the sheet metal and not structurally bond the sheet metal portions together;
 said fixture and locator means supporting the overlapped portions of sheet metal and the ribbon of resin in such relationship to said coil and without any substantial restraining of the overlapped portions of the sheet metal so they can flex and move due to being heated to an elevated temperature by the current applied to said coil and while subsequently cooling sufficiently for the resin to adhere to and tack them together, whereby the overlapped portions of sheet metal are tacked together without completely curing the ribbon of resin to structurally bond the sheet metal portions together so that after the assembly is removed from the apparatus the tacked ribbon of resin subsequently can be heated to a maximum temperature of not move than about 400° F. and for a sufficient period of time to fully cure the ribbon of resin to structurally bond the two overlapped sheet metal portions together without any significant distortion or warping of the assembly.

16. The apparatus of claim 15 wherein the current applied to said coil has a frequency of at least about 50,000 Hz and a power of at least about 350 watts per square inch of the ribbon of resin to be tacked to the sheet metal portions.

17. The apparatus of claim 15 wherein said coil is spaced about 0.03 to about 0.35 of an inch from a point half way between the adjacent metal portions engaging the ribbon of resin.

18. The apparatus of claim 15 wherein the current applied to the coil has a frequency of less than 200,000 Hz and which also comprises a holder bearing on the sheet metal assembly in an area spaced and remote from the ribbon of resin at least while the current is applied to the coil to prevent vibration of the sheet metal assembly.

19. The apparatus of claim 15 wherein after removal of the sheet metal assembly from such relationship with the coil to tack the resin, the ribbon of resin tacked to the sheet metal portions is subsequently received in a separate heating means constructed and arranged to heat the resin to a temperature of at least about 250° to cure the resin and structurally bond together the overlapped metal portions of the sheet metal assembly, said heating means comprising at least one second induction coil of an electrically conductive metal adjacent one of the sheet metal portions tacked to the ribbon of resin and extending generally along the ribbon of resin and disengaged and spaced from all of the sheet metal portions, a second power supply constructed and arranged to apply to the second coil an alternating current for a period of time not more than fifteen seconds and at a frequency of at least 3,000 Hz to heat by induction to a maximum temperature in the range of 250° F. to 400° F. only the portions of the sheet metal immediately adjacent the ribbon of resin, and a second fixture supporting the sheet metal assembly with the overlapped sheet metal portions and ribbon in such relationship to the second coil and without substantially restraining the overlapped sheet metal portions from flexing and moving due to being heated to an elevated temperature by the current applied to the second coil, whereby the ribbon of resin is raised to a curing temperature so that the overlapped sheet metal portions will be structurally bonded together without any significant distortion or warping of the sheet metal assembly.

20. The apparatus of claim 19 wherein said at least one second induction coil comrpises a pair of spaced apart induction coils and, after removal of the sheet metal assembly from such relationship with the coil, the ribbon of resin tacked to the sheet metal portions is subsequently heated to a curing temperature by said pair of second induction coils while disposed between them with said pair of second coils in spaced apart and generally opposed relation to each other and on generally opposite sides of the overlapped sheet metal portions with the resin therebetween with each of the second coils extending generally along and adjacent the ribbon of resin, lying closely adjacent to at least one of the overlapped sheet metal portions and disengaged and spaced from all of the sheet metal portions, applying to both of the second coils an alternating current for a period of time of not more than fifteen seconds to heat by induction to a maximum temperature in the range of about 250° to 400° F. only the sheet metal portions immediately adjacent the ribbon of resin, and said second fixture supporting the assembly with the overlapped sheet metal portions and the ribbon of resin in such relationship with the second coils without any substantial restraining of the overlapped sheet metal portions from flexing and moving due to being heated to an elevated temperature by the current applied to the second coils and while subsequently cooling, whereby the ribbon of resin is raised to a curing temperature so that the overlapped sheet metal portions will be structurally bonded together without any significant distortion or warping of the assembly.

21. The apparatus of claim 15 which also comprises a baking oven and wherein, after removal of the sheet metal assembly from such relationship with the coil to tack the resin, the resin tacked to the sheet metal portions is subsequently cured by placing the entire assembly of sheet metal portions tacked to the resin in said baking oven for at least fifteen minutes while such oven is operating to heat the entire assembly to a temperature in the range of 250° F. to 400° F., whereby a second stage of the resin is activated and cured to structurally bond the overlapped sheet metal portions of the assembly together.

* * * * *